(12) United States Patent
Yachida et al.

(10) Patent No.: US 9,016,722 B2
(45) Date of Patent: Apr. 28, 2015

(54) STEERING COLUMN DEVICE

(75) Inventors: Shosuke Yachida, Toyota (JP); Seiji Kondou, Toyota (JP); Shigeru Hoshino, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/353,145

(22) PCT Filed: Nov. 18, 2011

(86) PCT No.: PCT/JP2011/076682
§ 371 (c)(1),
(2), (4) Date: Apr. 21, 2014

(87) PCT Pub. No.: WO2013/073053
PCT Pub. Date: May 23, 2013

(65) Prior Publication Data
US 2014/0246848 A1  Sep. 4, 2014

(51) Int. Cl.
*B62D 1/19* (2006.01)
(52) U.S. Cl.
CPC . *B62D 1/19* (2013.01); *B62D 1/195* (2013.01)
(58) Field of Classification Search
CPC .................................. B62D 1/19; B62D 1/195
USPC .......................................................... 280/777
See application file for complete search history.

(56) References Cited

U.S. PATENT DOCUMENTS 4,400,012 A * 8/1983 Otsuka ........................... 280/777
5,026,092 A * 6/1991 Abramczyk ................. 280/777
5,605,073 A * 2/1997 Milton et al. .................... 74/492
5,803,496 A * 9/1998 Cymbal .......................... 280/777
5,819,592 A * 10/1998 Lewandowski et al. ......... 74/492
5,954,363 A * 9/1999 Cymbal et al. ................ 280/777

(Continued)

FOREIGN PATENT DOCUMENTS

JP  2-38179   2/1990
JP  2-127589  10/1990

(Continued)

OTHER PUBLICATIONS

International Search Report issued Feb. 21, 2012 in PCT/JP11/76682 filed Nov. 18, 2011.

*Primary Examiner* — Nicole Verley
(74) *Attorney, Agent, or Firm* — Oblon, McClelland, Maier & Neustadt, L.L.P.

(57) ABSTRACT

A steering column device includes a steering column for supporting a steering shaft in a freely rotatable manner, and a guide plate and a column bracket for assembling the steering column onto a part of a vehicle body. The steering column device further includes coupling bolts coupled to the column bracket through guide grooves of the guide plate and movable along the guide grooves when the column bracket moves toward the front of the vehicle relative to the guide plate. Further, an upper column cover movable toward the front of the vehicle together with the steering column is assembled above the steering column at a position corresponding to a vehicle rear of the guide plate. A unit for mitigating an impact is provided to a vehicle rear portion of the guide plate, and is configured to mitigate an impact to be caused when the upper column cover strikes, in the event of collision of the vehicle, against the vehicle rear portion of the guide plate along with movement of the steering column toward the front of the vehicle together with the column bracket.

5 Claims, 7 Drawing Sheets

(56) References Cited

U.S. PATENT DOCUMENTS 5,960,673 A * 10/1999 Eaton et al. .................... 74/492
2012/0080874 A1* 4/2012 Narita et al. ................. 280/777
2012/0193902 A1* 8/2012 Akutsu et al. ................ 280/777

FOREIGN PATENT DOCUMENTS

| JP | 2005-219641 | 8/2005 |
| JP | 2008-018920 | 1/2008 |
| JP | 2011-156878 | 8/2011 |

* cited by examiner

STEERING COLUMN DEVICE

TECHNICAL FIELD

The present invention relates to a steering column device applicable to a vehicle, and more particularly, to a steering column device including a steering column for supporting a steering shaft in a freely rotatable manner, a guide plate having a guide groove extending in a fore-and-aft direction of a vehicle along a column axis direction, and fixed to a vehicle body at a position above the steering column, a column bracket for supporting the steering column at a position below the guide plate, and assembled onto the guide plate so as to be movable toward the front of the vehicle relative to the guide plate, and a coupling member (coupling bolt) coupled to the column bracket through the guide groove of the guide plate, and movable along the guide groove when the column bracket moves toward the front of the vehicle relative to the guide plate.

BACKGROUND ART

The steering column device of this type is disclosed in, for example, Patent Literature 1. In the steering column device disclosed in Patent Literature 1, there is no description of a column cover (generally constructed of an upper column cover and a lower column cover that are separable into two upper and lower segments), but the upper column cover is generally assembled above the steering column at a position corresponding to a vehicle rear of the guide plate. In the event of collision of the vehicle, the upper column cover is movable toward the front of the vehicle together with the steering column.

CITATION LIST

Patent Literature

[PTL 1] JP 2005-219641 A

SUMMARY OF INVENTION

By the way, in the steering column device disclosed in Patent Literature 1, the vehicle rear end portion of the guide plate (referred to as "bracket mounted onto the vehicle body") simply extends in the column axis direction. Therefore, in the event of collision of the vehicle, the upper column cover assembled above the steering column at the position corresponding to the vehicle rear of the guide plate may significantly interfere with (strike against) the vehicle rear end portion of the guide plate to cause a serious impact load.

The present invention has been made to reduce the impact load described above, and one embodiment of the present invention has the following feature. Specifically, there is provided a steering column device, including:

a steering column for supporting a steering shaft in a freely rotatable manner;

a guide plate having a guide groove extending in a fore-and-aft direction of a vehicle along a column axis direction, the guide plate being fixed to a vehicle body at a position above the steering column;

a column bracket for supporting the steering column at a position below the guide plate, the column bracket being assembled onto the guide plate so as to be movable toward a front of the vehicle relative to the guide plate;

a coupling member coupled to the column bracket through the guide groove of the guide plate, the coupling member being movable along the guide groove when the column bracket moves toward the front of the vehicle relative to the guide plate; and an upper column cover assembled above the steering column at a position corresponding to a vehicle rear of the guide plate, the upper column cover being movable toward the front of the vehicle together with the steering column, the guide plate including, at a vehicle rear portion thereof, means for mitigating an impact to be caused when the upper column cover strikes, in an event of collision of the vehicle, against the vehicle rear portion of the guide plate along with movement of the steering column toward the front of the vehicle together with the column bracket.

Note that, the present invention may be carried out by providing a single guide groove and a single coupling member as well as providing a plurality guide grooves and a plurality of coupling members.

In the steering column device according to one embodiment of the present invention, the means for mitigating an impact is provided to the vehicle rear portion of the guide plate, and is configured to mitigate an impact to be caused when the upper column cover strikes against the vehicle rear portion of the guide plate in the event of collision of the vehicle. Therefore, there is no need to take measures to avoid the significant interference (strike) between the upper column cover and the guide plate. Examples of the measures include downsizing of the upper column cover and setting of the part of the guide plate, which may significantly interfere with the upper column cover, to be positioned even frontward in the vehicle with respect to the mounting point of the upper column cover on the vehicle body. However, those measures may result in cost increase. When the upper column cover is downsized, the gap between the upper column cover and the vehicle body side is increased to degrade the external appearance, and an additional component is necessary to hide the gap. When the part of the guide plate, which may significantly interfere with the upper column cover, is set to be positioned even frontward in the vehicle with respect to the mounting point of the upper column cover on the vehicle body, the guide plate needs to be upsized (the guide groove formed in the guide plate needs to have a predetermined length enough to move the column bracket, and hence the guide plate is upsized by an amount of the setting of the part of the guide plate, which may significantly interfere with the upper column cover, to be positioned even frontward in the vehicle with respect to the mounting point of the upper column cover on the vehicle body).

When carrying out the present invention as described above, the means for mitigating an impact may be means for guiding the upper column cover toward a lower side of the guide plate. The means for guiding may include an inclined surface formed by bending the vehicle rear portion of the guide plate so as to be inclined upward on a rear end side of the guide plate, and a height of the inclined surface may be set so that an upper front end of the upper column cover strikes against the inclined surface.

The above-mentioned means for guiding may include a breaking portion for breaking an upper front portion of the upper column cover. The breaking portion may be an edge portion for tearing and breaking the upper front portion of the upper column cover (the present invention may be carried out by providing a single edge portion as well as providing a plurality of edge portions). In this case, the upper column cover may include: a high-stiffness portion, which is high in stiffness in the fore-and-aft direction of the vehicle; and low-stiffness portions, which are low in stiffness in the fore-and-aft direction of the vehicle. The high-stiffness portion may be arranged at a center portion of the upper column cover in a width direction of the vehicle. The low-stiffness portions may be arranged on both sides of the high-stiffness portion in the width direction of the vehicle. The edge portion may be edge portions arranged so as to strike against the upper column cover at positions closer to the low-stiffness portions with respect to boundaries between the high-stiffness portion and the low-stiffness portions.

When carrying out the present invention as described above, the means for mitigating an impact may be a protruding portion for tearing and breaking an upper front portion of the upper column cover. In this case, the upper column cover may include: a high-stiffness portion, which is high in stiffness in the fore-and-aft direction of the vehicle; and low-stiffness portions, which are low in stiffness in the fore-and-aft direction of the vehicle. The high-stiffness portion may be arranged at a center portion of the upper column cover in a width direction of the vehicle. The low-stiffness portions may be arranged on both sides of the high-stiffness portion in the width direction of the vehicle. The protruding portion may be protruding portions arranged so as to strike against the upper column cover at positions closer to the low-stiffness portions with respect to boundaries between the high-stiffness portion and the low-stiffness portions.

DESCRIPTION OF EMBODIMENTS

Now, embodiments of the present invention are described with reference to the drawings. FIGS. 1 to 10 illustrate a steering column device according to a first embodiment of the present invention. The steering column device of this embodiment includes a steering column 20 for supporting a steering shaft 10 in a freely rotatable manner, a guide plate 30 and a column bracket 40 for assembling the steering column 20 onto a part of a vehicle body, a pair of right and left coupling bolts 50, a locking mechanism 60, and the like.

The steering shaft 10 includes a lower shaft 11 and an upper shaft 12. The lower shaft 11 and the upper shaft 12 are extensible and contractible in a column axis direction, and are coupled to each other so as to allow torque transmission. The lower shaft 11 is supported by a lower tube 21 of the steering column 20 in a rotatable manner, and is coupled to a steering gear box (not shown) at a lower end (distal end) of the lower shaft 11 (not shown). The upper shaft 12 is supported by an upper tube 22 of the steering column 20 in a rotatable and axially immovable manner, and is integrally coupled to a steering wheel (not shown) at an upper end of the upper shaft 12.

The steering column 20 includes the lower tube 21 assembled onto a part of the vehicle body at a lower end (distal end) of the lower tube 21 (not shown) through an intermediation of a lower bracket (not shown) so as to be tiltable in an up-and-down direction, and the upper tube 22 coupled to the lower tube 21 so as to be extensible and contractible in the column axis direction. The upper tube 22 is provided integrally with a distance bracket 23, and is fixed, in a releasable manner, to the column bracket 40 with the distance bracket 23 through an intermediation of the locking mechanism 60. Note that, the distance bracket 23 is formed into a U-shape, and telescoping elongate holes 23a extending in the column axis direction are formed in right and left side walls of the distance bracket 23, respectively.

The guide plate 30 is configured to be fixed to the vehicle body at a position above the steering column 20 and the column bracket 40. The guide plate 30 has a pair of right and left guide grooves 31 and 31 extending in a fore-and-aft direction of the vehicle along the column axis direction. Note that, the guide plate 30 is configured to be fixed to the vehicle body with mounting bolts (not shown) to be inserted into a pair of right and left mounting holes 32 and 32.

The column bracket 40 supports the steering column 20 at a position below the guide plate 30 so that the steering column 20 is adjustable in tilting and telescoping thereof. The column bracket 40 is assembled onto the guide plate 30 so as to be movable (disengageable) toward the front of the vehicle relative to the guide plate 30 through a pair of right and left mounting elongate holes 41 and 41 (see the mounting elongate holes opened at rear ends in FIG. 5). Note that, the column bracket 40 and the guide plate 30 are configured to be fixed to the vehicle body through use of a pair of right and left collars 81, capsules 82, and mounting bolts (not shown).

The pair of right and left coupling bolts 50 include, at distal ends thereof, external thread portions 51 threadedly coupled into screw holes 42 of the column bracket 40 through the guide grooves 31 of the guide plate 30, and also include intermediate shank portions 52 slidably fitted into the guide grooves 31. When the column bracket 40 moves toward the front of the vehicle relative to the guide plate 30, the pair of right and left coupling bolts 50 are movable along the guide grooves 31 integrally with the column bracket 40.

The locking mechanism 60 itself is a publicly-known mechanism. The locking mechanism 60 includes a non-rotatable bolt 61 extending in a right-and-left direction of the vehicle while being inserted through the pair of right and left telescoping elongate holes 23a provided in the distance bracket 23 and extending in the column axis direction, and through a pair of right and left tilting elongate holes 43 provided in the column bracket 40 and extending substantially in the up-and-down direction, an operation lever 62 assembled onto a left end portion of the bolt 61 and operable to pivot in the up-and-down direction, a cam unit 63 assembled onto the bolt 61 at a position between the operation lever 62 and the column bracket 40 and configured to move the bolt 61 in a bolt axis direction along with the pivot of the operation lever 62 so as to fix and unfix the distance bracket 23 and the column bracket 40, and a nut 64 threadedly fixed onto the bolt 61. Note that, an adjustment lever 65 (rotatable integrally with the nut 64) and an adjustment bolt 66 (configured to fasten the adjustment lever 65 to the operation lever 62 together) for adjusting an initial state of the cam unit 63 are assembled between the operation lever 62 and the nut 64.

By the way, in the first embodiment, a guide piece 33 serving as means for mitigating an impact is integrally provided to a vehicle rear portion of the metal guide plate 30. The guide piece 33 serves as means for mitigating an impact to be caused when a resin upper column cover 70 (see FIG. 1) assembled above the steering column 20 strikes, due to a secondary impact in the event of collision of the vehicle, against the vehicle rear portion of the guide plate 30 along with movement of the steering column 20 toward the front of the vehicle together with the column bracket 40.

The guide piece 33 is formed by bending the vehicle rear portion of the guide plate 30 so as to be inclined upward on the rear end side by a predetermined amount. The guide piece 33 has an inclined surface S (see FIGS. 4 and 10) as a back surface thereof, and a height H of the inclined surface S (height from an upper surface of the upper tube 22 on the outer circumference thereof) is set so that an upper front end 71 of the upper column cover 70 strikes against the inclined surface S. Therefore, when the upper front end 71 of the upper column cover 70 strikes against the guide piece 33, the front portion of the upper column cover 70 is guided toward a lower side of the guide plate 30 (see FIG. 10).

Further, in the first embodiment, edge portions 33a and 33b are formed at both right and left ends of the guide piece 33. Each of the edge portions 33a and 33b serves as a breaking portion for tearing and breaking the upper front portion of the upper column cover 70. The edge portions 33a and 33b are arranged so as to strike against the upper column cover 70 at positions closer to low-stiffness portions 73 and 73 with respect to boundaries L1 and L2 between a high-stiffness portion 72 and the low-stiffness portions 73 and 73 of the upper column cover 70. The high-stiffness portion 72 is a part of the upper column cover 70 that is high in stiffness in the fore-and-aft direction of the vehicle, and is arranged at a center portion of the upper column cover 70 in a width direction of the vehicle. On the other hand, each of the low-stiffness portions 73 and 73 is a part of the upper column cover 70 that is low in stiffness in the fore-and-aft direction of the vehicle, and is arranged on each side of the high-stiffness portion 72 of the upper column cover 70 in the width direction of the vehicle. Note that, the low-stiffness portions 73 and 73 are thinned, and the shape of the thinned portion is retained by thin grid-like ribs 73a and 73a (see FIG. 9).

Figure 1:
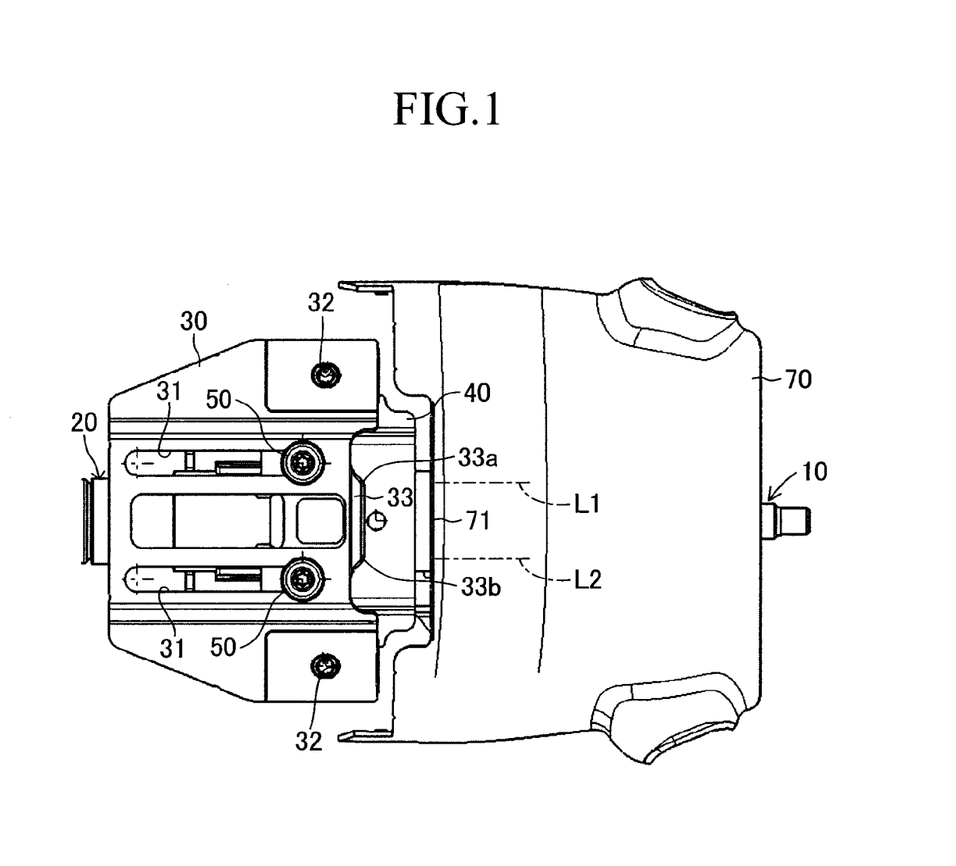
FIG. 1 is a plan view of a steering column device according to a first embodiment of the present invention.
Figure 2:
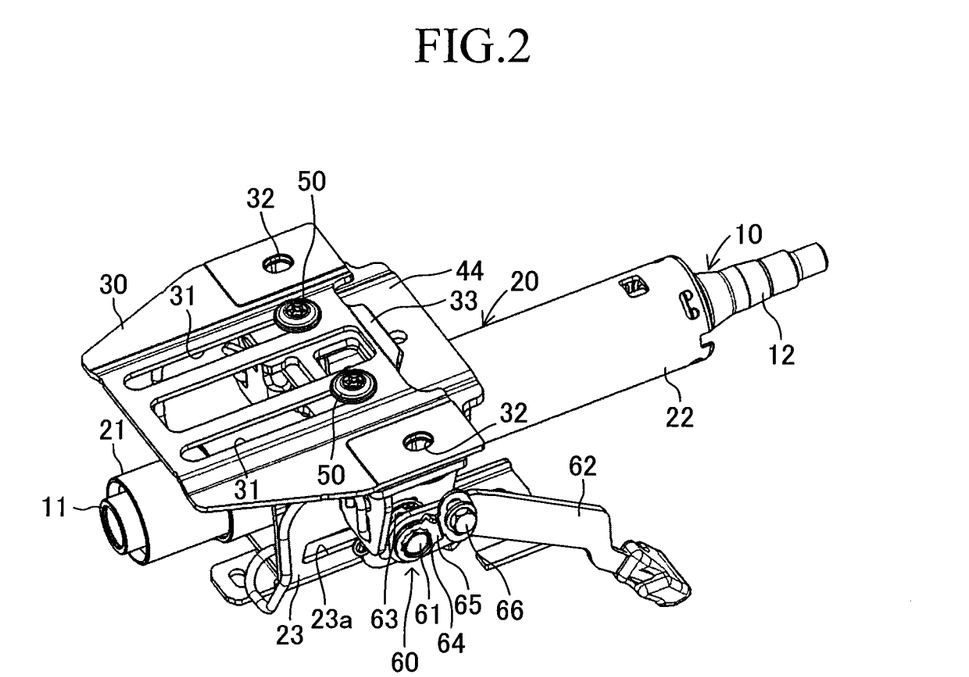
FIG. 2 is a perspective top view of the steering column device illustrated in FIG. 1, from which an upper column cover is removed.
Figure 3:
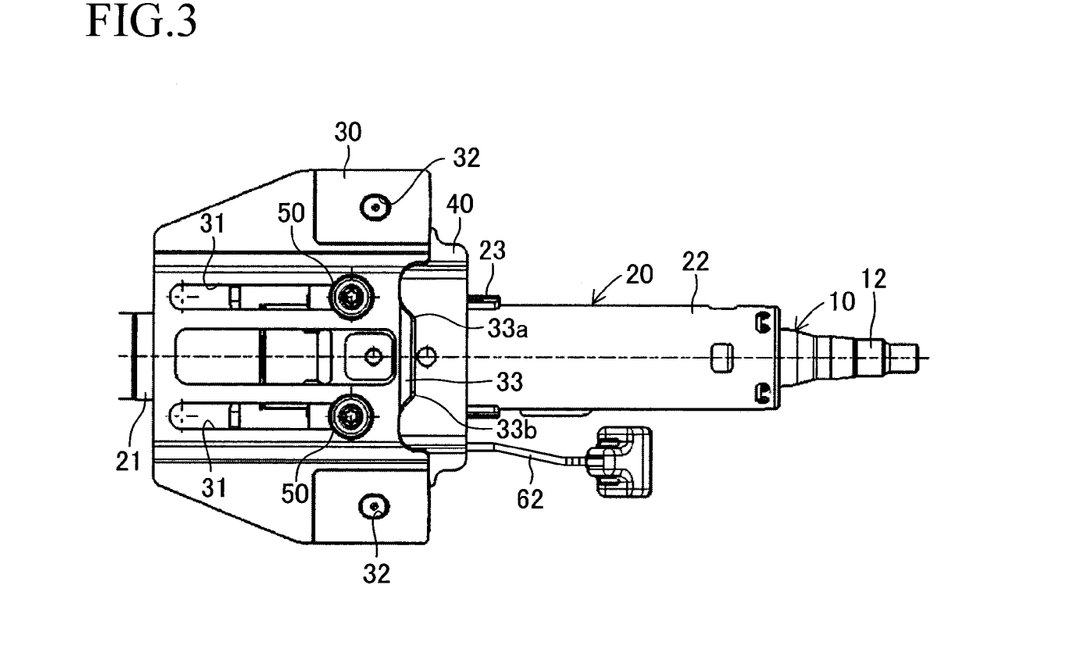
FIG. 3 is a plan view of the steering column device illustrated in FIG. 2.
Figure 4:
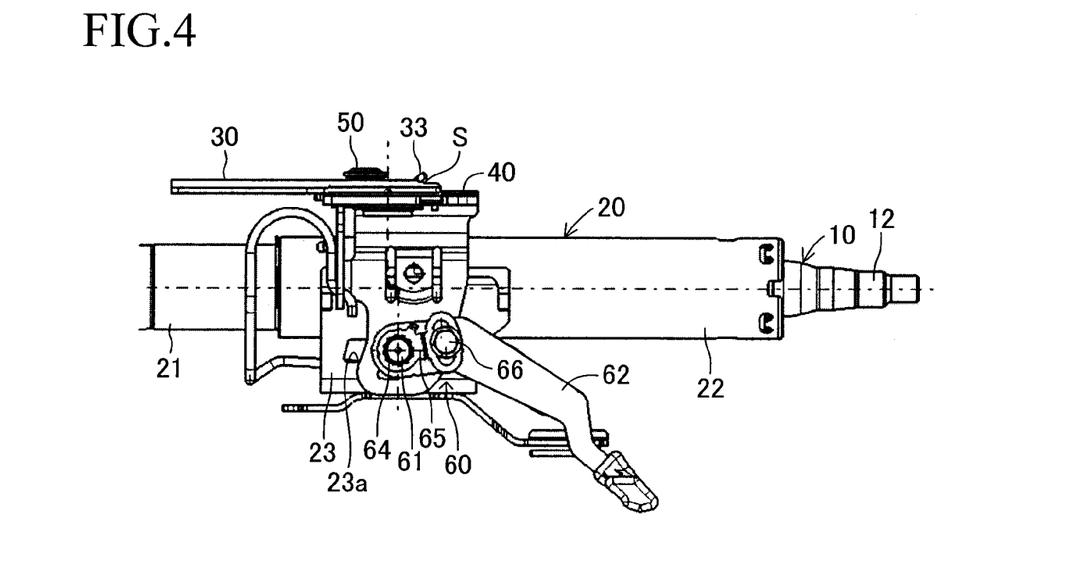
FIG. 4 is a side view of the steering column device illustrated in FIG. 3.
Figure 5:
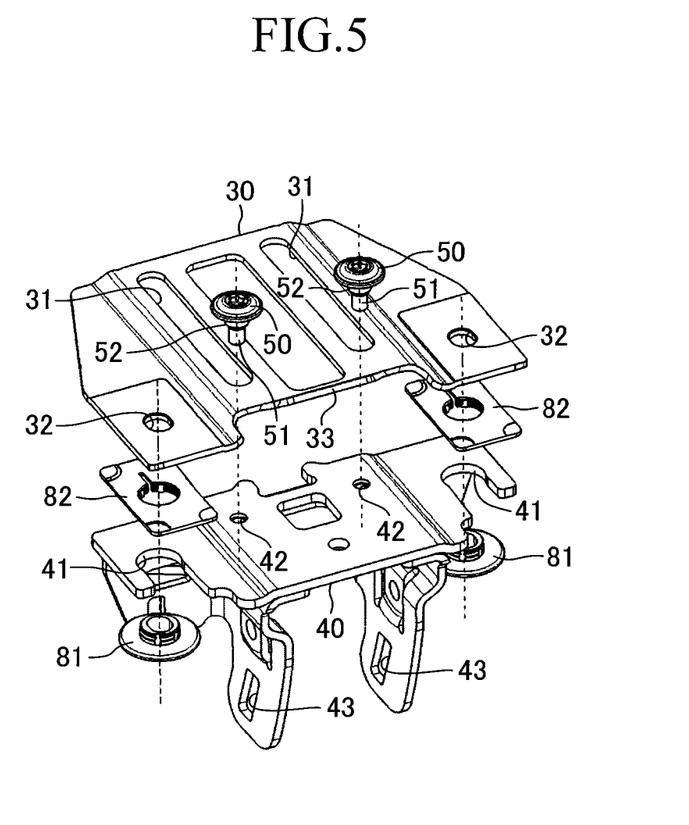
FIG. 5 is an exploded perspective view of a guide plate, a column bracket, and coupling bolts illustrated in FIGS. 1 to 4.
Figure 6:
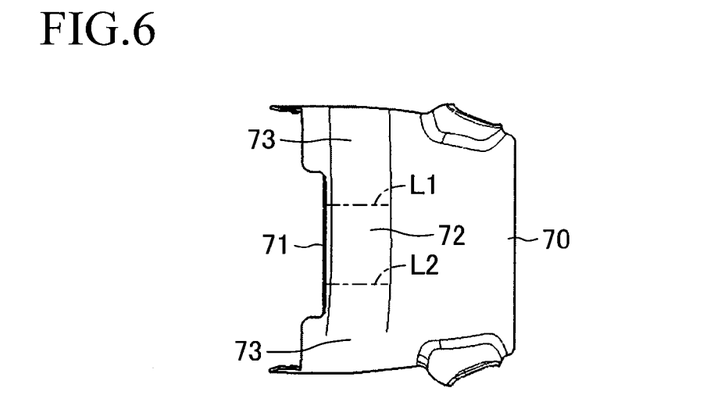
FIG. 6 is a plan view of the upper column cover illustrated in FIG. 1.
Figure 7:
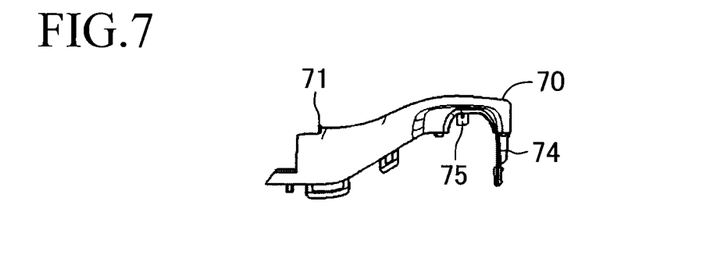
FIG. 7 is a side view of the upper column cover illustrated in FIG. 6.
Figure 8:
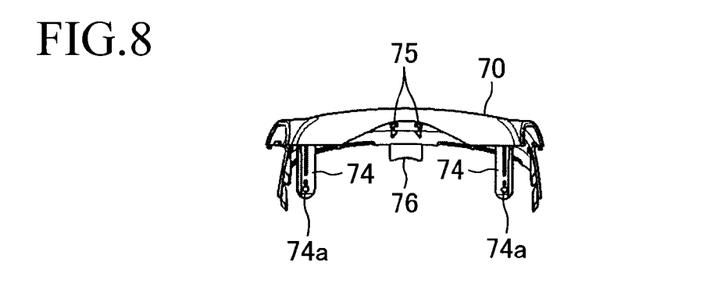
FIG. 8 is a rear view of the upper column cover illustrated in FIG. 6.
Figure 9:
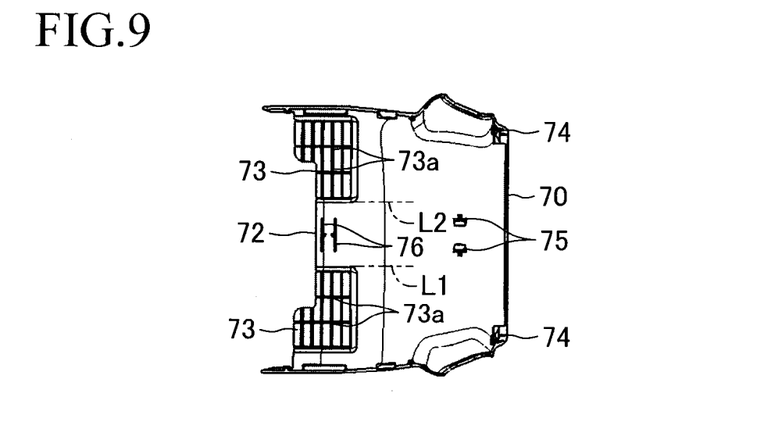
FIG. 9 is a bottom view of the upper column cover illustrated in FIG. 6.
Figure 10:
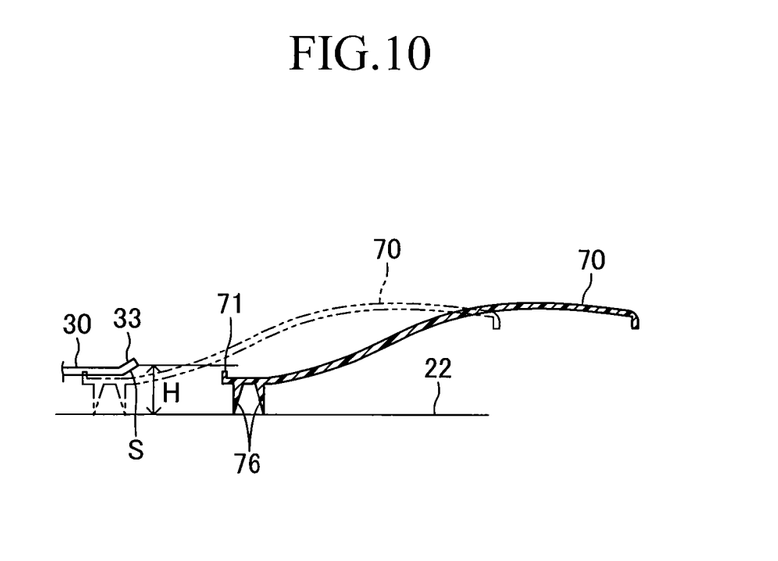
FIG. 10 is a schematic operational view illustrating a relationship between the guide plate and the upper column cover illustrated in FIG. 1.

Note that, as illustrated in FIG. 1, the upper column cover 70 of the first embodiment is assembled above the upper tube 22 of the steering column 20 at a position corresponding to the vehicle rear of the guide plate 30. Specifically, the upper column cover 70 is configured so that the upper column cover 70 is assembled onto a publicly-known turn signal switch assembly (not shown), which is assembled onto a rear portion of the upper tube 22, with a pair of right and left screws (not shown) through mounting holes 74a and 74a (see FIG. 8) formed in a pair of right and left leg portions 74 and 74 of the upper column cover 70, and that a pair of claws 75 (see FIG. 8) are fitted into engagement portions of the turn signal switch assembly (not shown).

Note that, the upper column cover 70 includes protrusions 76 (see FIG. 10) held in abutment against the upper surface of the upper tube 22 of the steering column 20. With the protrusions 76, the upper column cover 70 is positioned in the up-and-down direction, and the support stiffness of the upper column cover 70 on the upper tube 22 is secured. Further, the upper column cover 70 includes a lower column cover (not shown) for covering the upper tube 22 of the steering column 20 so as to enclose the upper tube 22 from the bottom. The lower column cover is configured to be fitted and fixed with a plurality of claws.

In the first embodiment configured as described above, the guide piece 33 serving as the means for mitigating an impact is provided to the vehicle rear portion of the guide plate 30. The guide piece 33 mitigates an impact to be caused when the upper column cover 70 strikes against the vehicle rear portion of the guide plate 30 in the event of collision of the vehicle. Therefore, there is no need to take measures to avoid significant interference (strike) between the upper column cover 70 and the guide plate 30, which may result in cost increase, such as downsizing of the upper column cover (the gap between the upper column cover and the vehicle body side is increased to degrade the external appearance, and an additional component is necessary to hide the gap), and setting of the part of the guide plate, which may significantly interfere with the upper column cover, to be positioned even frontward in the vehicle with respect to the mounting point of the upper column cover on the vehicle body (the guide plate needs to be upsized). Note that, when the upper column cover is downsized, the gap between the upper column cover and the vehicle body side is increased, and an additional component is necessary to reduce the gap, resulting in the cost increase.

Further, in the first embodiment, the edge portions 33a and 33b formed at both the right and left ends of the guide piece 33 are arranged so as to strike against the upper column cover 70 at the positions closer to the low-stiffness portions 73 and 73 with respect to the boundaries L1 and L2 between the high-stiffness portion 72 and the low-stiffness portions 73 and 73 of the upper column cover 70. Therefore, when the upper column cover 70 strikes against the guide piece 33 in the event of collision of the vehicle, the upper front portion of the upper column cover 70 is torn and broken by the edge portions 33a and 33b. Thus, the impact to be caused when the upper column cover 70 strikes against the vehicle rear portion of the guide plate 30 is reduced.

Figure 11:
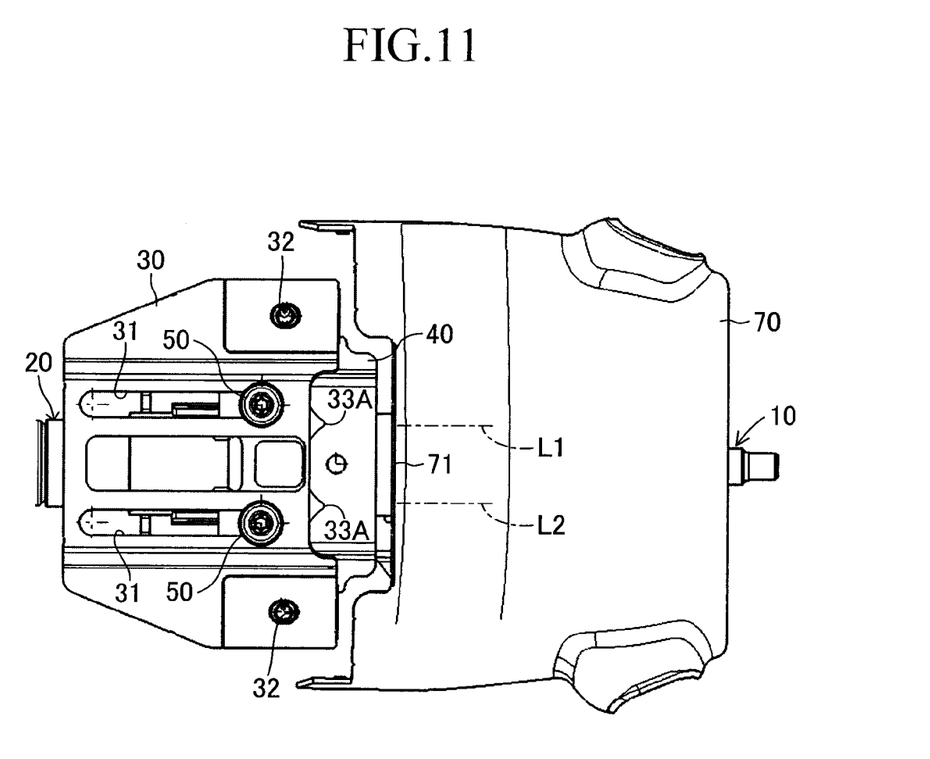
FIG. 11 is a plan view of a steering column device according to a second embodiment of the present invention.

In the first embodiment described above, the present invention is carried out by providing the pair of right and left guide grooves 31 of the guide plate 30 and the pair of right and left coupling bolts 50. Alternatively, the present invention may be carried out by appropriately increasing and decreasing the number of guide grooves and the number of coupling bolts, and may be carried out by providing a single guide groove and a single coupling bolt. Further, in the first embodiment described above, the guide piece 33 serves as the means for mitigating an impact to be caused when the upper column cover 70 strikes against the vehicle rear portion of the guide plate 30. Alternatively, as in a second embodiment of the present invention illustrated in FIG. 11, the above-mentioned means for mitigating an impact may be a pair of right and left protruding portions 33A and 33A for tearing and breaking the upper front portion of the upper column cover 70. The protruding portions 33A and 33A of the second embodiment illustrated in FIG. 11 are arranged so as to strike against the upper column cover 70 at the positions closer to the low-stiffness portions 73 and 73 with respect to the boundaries L1 and L2 between the high-stiffness portion 72 and the low-stiffness portions 73 and 73 of the upper column cover 70. Therefore, similar actions and effects to those in the first embodiment described above can be attained in the second embodiment as well.

In the embodiments described above, the present invention is carried out so that the upper column cover assembled above the steering column at the position corresponding to the vehicle rear of the guide plate is configured to be fitted and fixed to the turn signal switch assembly and fastened with screws. Alternatively, the present invention may be carried out so that the upper column cover is configured to be simply fitted and fixed to the turn signal switch assembly or the steering column.

Further, in the embodiments described above, the present invention is applied to the steering column device including the steering column that is supported so as to be adjustable in tilting and telescoping thereof. In a similar manner to the embodiments described above or through appropriate modification thereof, the present invention may also be applied to a steering column device including the steering column that is not supported so as to be adjustable in tilting and telescoping thereof. Thus, the present invention is not limited to the embodiments described above. Further, in the embodiments described above, the present invention is applied to the steering column device without a mechanism for absorbing impact energy to be caused by the secondary impact in the event of collision of the vehicle (secondary impact energy absorbing mechanism). In a similar manner to the embodiments described above or through appropriate modification thereof, the present invention may also be applied to a steering column device including the secondary impact energy absorbing mechanism. Thus, the present invention is not limited to the embodiments described above.

The invention claimed is:

1. A steering column device, comprising:
a steering column for supporting a steering shaft in a freely rotatable manner;
a guide plate having a guide groove extending in a fore-and-aft direction of a vehicle along a column axis direction,
the guide plate being fixed to a vehicle body at a position above the steering column;
a column bracket for supporting the steering column at a position below the guide plate,
the column bracket being assembled onto the guide plate so as to be movable toward a front of the vehicle relative to the guide plate;
a coupling member coupled to the column bracket through the guide groove of the guide plate,
the coupling member being movable along the guide groove when the column bracket moves toward the front of the vehicle relative to the guide plate; and
an upper column cover assembled above the steering column at a position corresponding to a vehicle rear of the guide plate,
the upper column cover being movable toward the front of the vehicle together with the steering column,
the guide plate comprising, at a vehicle rear portion thereof, means for mitigating an impact to be caused when the upper column cover strikes, in an event of collision of the vehicle, against the vehicle rear portion of the guide plate along with movement of the steering column toward the front of the vehicle together with the column bracket,
the means for mitigating an impact comprising means for guiding the upper column cover toward a lower side of the guide plate,
the means for guiding comprising a breaking portion for breaking an upper front portion of the upper column cover.

2. A steering column device according to claim 1,
wherein the means for guiding comprises an inclined surface formed by bending the vehicle rear portion of the guide plate so as to be inclined upward on a rear end side of the guide plate, and
wherein a height of the inclined surface is set so that an upper front end of the upper column cover strikes against the inclined surface.

3. A steering column device according to claim 1, wherein the breaking portion comprises an edge portion for tearing and breaking the upper front portion of the upper column cover.

4. A steering column device according to claim 3,
wherein the upper column cover comprises:
a high-stiffness portion, which is high in stiffness in the fore-and-aft direction of the vehicle; and
low-stiffness portions, which are low in stiffness in the fore-and-aft direction of the vehicle,
wherein the high-stiffness portion is arranged at a center portion of the upper column cover in a width direction of the vehicle,
wherein the low-stiffness portions are arranged on both sides of the high-stiffness portion in the width direction of the vehicle, and
wherein the edge portion comprises edge portions arranged so as to strike against the upper column cover at positions closer to the low-stiffness portions with respect to boundaries between the high-stiffness portion and the low-stiffness portions.

5. A steering column device, comprising:
a steering column for supporting a steering shaft in a freely rotatable manner;
a guide plate having a guide groove extending in a fore-and-aft direction of a vehicle along a column axis direction,
the guide plate being fixed to a vehicle body at a position above the steering column;
a column bracket for supporting the steering column at a position below the guide plate,
the column bracket being assembled onto the guide plate so as to be movable toward a front of the vehicle relative to the guide plate;
a coupling member coupled to the column bracket through the guide groove of the guide plate,
the coupling member being movable along the guide groove when the column bracket moves toward the front of the vehicle relative to the guide plate; and
an upper column cover assembled above the steering column at a position corresponding to a vehicle rear of the guide plate,
the upper column cover being movable toward the front of the vehicle together with the steering column,
the guide plate comprising, at a vehicle rear portion thereof, means for mitigating an impact to be caused when the upper column cover strikes, in an event of collision of the vehicle, against the vehicle rear portion of the guide plate along with movement of the steering column toward the front of the vehicle together with the column bracket,
the means for mitigating an impact comprising a protruding portion for tearing and breaking an upper front portion of the upper column cover,
the upper column cover comprising:
a high-stiffness portion, which is high in stiffness in the fore-and-aft direction of the vehicle; and
low-stiffness portions, which are low in stiffness in the fore-and-aft direction of the vehicle, the high-stiffness portion being arranged at a center portion of the upper column cover in a width direction of the vehicle, the low-stiffness portions being arranged on both sides of the high-stiffness portion in the width direction of the vehicle, the protruding portion comprising protruding portions arranged so as to strike against the upper column cover at positions closer to the low-stiffness portions with respect to boundaries between the high-stiffness portion and the low-stiffness portions.

\* \* \* \* \*